United States Patent [19]

Suzuki et al.

[11] Patent Number: 5,077,077
[45] Date of Patent: Dec. 31, 1991

[54] OIL-IN-WATER-IN-OIL DOUBLY EMULSIFIED FAT OR OIL COMPOSITION

[75] Inventors: Kesatoshi Suzuki, Chiba; Kenichi Uehara; Hisao Omura, both of Ibaraki, all of Japan

[73] Assignee: Kao Corporation, Tokyo, Japan

[21] Appl. No.: 597,160

[22] Filed: Oct. 15, 1990

[30] Foreign Application Priority Data

Oct. 31, 1989 [JP] Japan ................................ 1-284250

[51] Int. Cl.$^5$ .............................................. A23D 7/00
[52] U.S. Cl. ................................... 426/602; 426/601; 426/611; 426/654
[58] Field of Search ........................................ 426/602

[56] References Cited

U.S. PATENT DOCUMENTS 3,917,859 11/1975 Terada et al. ...................... 426/602
4,976,984 12/1990 Yasukawa et al. ................. 426/602

FOREIGN PATENT DOCUMENTS 56-10014 3/1981 Japan.
8165736 9/1983 Japan.
8170432 10/1983 Japan.

OTHER PUBLICATIONS

Furia, T. E., 1972, "CRC Handbook of Food Additives", vol. 1; CRC Press, Cleveland, Ohio, pp. 398, 400, 406–408.

Primary Examiner—Donald E. Czaja
Assistant Examiner—John Mowbray
Attorney, Agent, or Firm—Birch, Stewart, Kolasch & Birch

[57] ABSTRACT

An oil-in-water-in-oil doubly emulsified fat or oil composition suitable for cream, spread, confectionery and baking, which contains a diglyceride having an open-tube melting point of below 20° C. in the outermost oil phase and/or the innermost oil phase. The stability of this composition is further dramatically improved by using a phospholipid mixture as an emulsifying agent.

6 Claims, No Drawings

OIL-IN-WATER-IN-OIL DOUBLY EMULSIFIED FAT OR OIL COMPOSITION

FIELD OF THE INVENTION

This invention relates to an oil-in-water-in-oil doubly emulsified fat or oil composition, and more particularly to a general-purpose oil-in-water-in-oil doubly emulsified fat or oil composition that exhibits excellent emulsion stability, meltability in the mouth and shape retention characterized by containing a diglyceride in the innermost oil phase (hereinafter referred to as $O_1$) and/or the outermost oil phase (hereinafter referred to as $O_2$) of an oil-in-water-in-oil (hereinafter referred to as $O_1/W/O_2$) doubly emulsified fat or oil composition. The composition is prepared by emulsifying an oil-in-water emulsion as a primary emulsion (hereinafter referred to as an $O_1$/emulsion) in $O_2$. Preferably, the emulsion contains a phospholipid mixture as an emulsifying agent.

BACKGROUND OF THE INVENTION

An oil-in-water (hereinafter referred to as O/W) emulsified fat or oil composition has been known to be featured in that its plasticity is not affected by the hardness of the fat or oil used because the external phase is water, and it has good flavor, nonstickiness, spreadability, etc., and is used for a foaming emulsified composition for confectionery and baking, whipped cream, etc.

However, this O/W emulsified fat or oil composition has drawbacks such that it is apt to cause the growth of microorganisms because its external phase is water.

On the contrary, a water-in-oil (hereinafter referred to as W/O) emulsified fat or oil has heretofore been extensively used for cream, spread, cooking, confectionery, baking, etc.

However, the W/O emulsified fat or oil has a drawback that the fat or oil of the outermost layer must be soft to give improved meltability in the mouth when being used in cream or spread.

In order to improve the drawbacks of the O/W or W/O emulsified fat or oil while realizing their merits, many $O_1/W/O_2$ doubly emulsified fat or oil compositions were studied, and many techniques for producing $O_1/W/O_2$ doubly emulsified fat or oil compositions having a natural butter-like aftertaste and body were proposed. For example, the use of a flavored fat or oil as the fat or oil to be used in $O_1$ was proposed in Japanese Patent Laid-Open No. 165736/1983.

However, when the stability of the innermost oil phase $O_1$ in the initially prepared inner phase O/W emulsion is remarkably poor the fusion of $O_1$ with $O_2$ occurs even if the proportions of $O_1$, W and $O_2$ kwere predetermined, especially in the step of rapid cooling and kneading after emulsifying the $O_1$/W emulsion in the $O_2$. Thus, the amount of remaining $O_1$ is extremely reduced. As a result, the obtained emulsion is similar to a W/O emulsion, so that it cannot fully exhibit a good taste characteristic of the intended $O_1/W/O_2$ doubly emulsified fat or oil composition.

Therefore, it is desired to improve the stability of an $O_1/W$ emulsion in order to keep the fat or oil globules of $O_1$ stable without being destroyed and fused with the $O_2$ fat or oil.

Meanwhile, an oil-in-water-in-oil doubly emulsified fat or oil composition is liable to cause bleeding of water or oil-off during storage, or destruction of emulsion accompanied with the separation of an aqueous phase and spoilage in bulk handling, so that it has not been satisfactorily applied to various fields.

In order to overcome these defects, it has already been proposed to use various emulsifying agents. For example, it has been known to use a sucrose fatty acid ester having an HLB of 1 to 4 (see Japanese Patent Publication No. 10014/1981) or a glycerol fatty acid ester (see U.S. Pat. No. 3,889,005) or to use both of a polyglycerol fatty acid ester and a fatty acid ester having at least 12 carbon atoms together (see Japanese Patent Laid-open No. 170432/1983).

Among the above polyglycerol fatty acid esters, polyglycerol condensed ricinoleic acid ester is particularly excellent in emulsifying power. However, an oil-in-water-in-oil doubly emulsified fat or oil composition prepared by using this ester has a soft, i.e., tasty texture, so that the composition is poor in shape retention and is liable to cause oil-off. Further, the composition is also poor in long-term stability at low temperature to cause separation of an aqueous phase.

SUMMARY OF THE INVENTION

The inventors of this invention have made comprehensive studies in order to stabilize an $O_1/W$ emulsion and to obtain an $O_1/W/O_2$ doubly emulsified fat or oil composition improved in emulsion stability, meltability in the mouth and shape retention, whereupon they have found out that an $O_1/W/O_2$ doubly emulsified fat or oil composition having improved in emulsion stability, meltability in the mouth and shape retention can be obtained by adding a diglyceride to the oil phases ($O_1$ and/or $O_2$), and that this $O_1/W/O_2$ doubly emulsified fat or oil composition can be further dramatically improved in stability by using a phospholipid mixture in a specified amount. The invention has been accomplished on the basis of these findings.

The invention includes an embodiment which further comprises 0.01 to 10 percent by weight of a phospholipid mixture in the innermost and/or the outermost oil phases. The phospholipid mixture preferably includes lecithin. Another embodiment further comprises 0.01 to 10 percent by weight of a phospholipid mixture in the innermost and/or the outermost oil phases, the phospholipid mixture comprising a phospholipid having no nitrogen and another having nitrogen at a weight ratio of 1.0 or larger.

Namely, this invention provides a general-purpose $O_1/W/O_2$ doubly emulsified fat or oil composition suitable for cream, spread, confectionery and baking, containing 10 to 100% by weight, based on the total fat or oil content (the total content of $O_1$ and $O_2$) of a diglyceride in the innermost oil phase and/or the outermost oil phase ($O_1$ and/or $O_2$).

Further, this invention also provides an oil-in-water-in-oil doubly emusified fat or oil composition as described above which is further improved in stability by incorporating 0.01 to 10% by weight of a phospholipid mixture as at least a part of the emulsifying agent used.

DETAILED DESCRIPTION OF PREFERRED EMBODIMENTS

The diglyceride used as a fat or oil which constitutes $O_1$ and $O_2$ of the $O_1/W/O_2$ doubly emulsified fat or oil composition of this invention is not particularly limited as far as it is derived from an edible fat or oil, and can be obtained by transesterifying a mixture of glycerol with at least one fat or oil selected from among usual vegetable fats and oils, for example, safflower oil, olive oil, cotton seed oil, rape oil, coconut oil, palm kernal oil, palm oil, soybean oil and corn oil; animal oils, for example, lard, beef tallow, fish oil and milk fat; and fractionated oils, transesterified oils, randomized oils and hardened oils of these animal and vegetable oils in the presence of an alkali metal or/and an alkaline earth metal or by esterifying a mixture of a fatty acid with glycerol with lipase.

In order to increase the diglyceride content of the obtained diglyceride-containing product, it is suitable to subject the product to treatment by distillation or silicic acid column chromatography, and, on the contrary, in order to decrease the diglyceride content, it is suitable to mix the product with at least one of the above-mentioned fat or oil as the starting material.

The diglyceride used in this invention is desirably one having an open-tube melting point of below 20° C., more desirably −20° to 15° C., especially −15° to 15° C. The diglyceride content is 10 to 100 % by weight, desirably 15 to 99.5% by weight based on the total fat or oil content.

Further, the fatty acid constituting said diglyceride is desirably an unsaturated fatty acid of 16 to 22 carbon atoms, and the content of said unsaturated fatty acid residues is 70% by weight or above, especially 80% by weight or above based on the total fatty acid residues of the diglyceride. Especially, it is desirable to use a diunsaturated diglyceride. It is more desirable to use a di-cis-unsaturated diglyceride, and its content is 50% by weight or above, more desirably 70 wt.% by weight or above based on the diglyceride.

The emulsion stability and meltability of the $O_1/W/O_2$ doubly emulsified fat or oil composition of this invention can be increased because of the presence of said diglyceride in $O_1$ and/or $O_2$. Especially when this diglyceride is present in $O_2$, the diglyceride can exhibit a remarkable effect of improving the meltability in the mouth. Namely, a fat or oil of a high melting point must be used in the outermost phase to maintain the shape retention of cream or spread at high temperatures. In this case, the meltability in the mouth is markedly worsened. On the contrary, by incorporating a diglyceride in the outermost oil phase in this invention, the meltability in the mouth can be markedly improved without any problem of shape retention.

The fat or oil other than the diglyceride to be used in the innermost oil phase $O_1$ and the outermost oil phase $O_2$ in the $O_1/W/O_2$ doubly emulsified fat or oil composition of this invention is not particularly limited as far as it is an edible fat or oil, and any of vegetable fats or oils such as soybean oil, rape oil, palm oil, corn oil, cotton seed oil, coconut oil and palm kernel oil and animal fats or oils such as lard, fish oil, whale oil and milk fat can be used. Furthermore fats or oils prepared by hydrogenating or transesterifying these fats or oils can also be used.

Soybean lecithin is effective as an emulsifier for the invention. The emulsifier for the invention preferably includes a phospholipid mixture, which may be contained in the composition in the outermost and/or innermost oil phases, in an amount of 0.01 to 10 percent by weight. The phospholipid mixture may have a ratio of the amount of nitrogen atom-free phospholipids to that of nitrogen atom-containing phospholipids of at least 1.0 by weight, i.e., a phospholipid mixture which is reduced in the content of phosphatidylcholine, phosphatidyl-ethanolamine and the like. According to this invention, the phospholipid mixture is contained in the oil phases in an amount of 0.01 to 10% by weight, preferably 0.05 to 5% by weight.

The phospholipid mixture according to this invention characterized by a reduced content of nitrogen atom-containing phospholipids such as phosphatidylcholine and phosphatidylethanolamine may be a mixture containing phosphatidic acid and/or a salt thereof, phosphatidylinositol, phosphatidylglycerol and/or a lyso derivative thereof. Particularly, it is preferable to use a mixture containing at least 15% by weight (based on the total phospholipids) of phosphatidic acid and/or its salt.

The phosphatidic acid to be used in this invention includes those represented by the following general formulas (I) and (II):

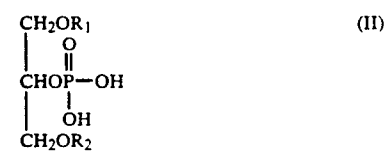

(wherein $R_1$ and $R_2$ may be the same or different from each other and are each a saturated or unsaturated aliphatic acyl group having 8 to 24 carbon atoms).

The counter cation constituting the phosphatidic acid salt to be used in this invention includes sodium, potassium, calcium, aluminum, magnesium and ammonium. Further, the phosphatidic acid and its salt may contain with lysophosphatidic acid and/or salts thereof with cations as listed above.

The phospholipid mixture having a ratio of the amount of nitrogen atom-free phospholipids as described above to that of nitrogen atom-containing phospholipids of at least 1.0 by weight can be prepared by subjecting a natural lecithin as a raw material to enzymatic treatment (treatment with phospholipase D) and fractionation to thereby reduce the content of phosphatidylcholine and phosphatidylethanolamine, while enhancing the content of phosphatidic acid and phosphatidylinositol to a predetermined level. The natural lecithin to be used includes those originating from vegetables such as soybean, rape, sunflower and corn; and that originating from animal such as yolk.

The phospholipid mixture prepared above may be further subjected to solvent fractionation, fractionation with an ion exchange column or a silicic acid column or electrodialysis.

Further, synthetic phospholipids as well as those prepared by enzymatic treatment may be used in this invention. For example, it is possible to use one prepared by treating a monoglyceride or a diglyceride with a phosphorus oxidizing agent (such as phosphorus pentaoxide, phosphorus pentachloride or phosphorus oxychloride).

The oil-in-water-in-oil doubly emulsified fat or oil composition of this invention characterized by excellent emulsion stability can be prepared by incorporating 0.01 to 10% by weight of the phospholipid mixture thus prepared in the oil phases.

The pH of the intermediate water phase W of the $O_1/W/O_2$ doubly emulsified fat or oil composition of the invention is desirably in the range of 5.5 to 8.5, especially 6 to 7.

In order to improve the taste, nutrition and emulsion stability of the $O_1/W/O_2$ doubly emulsified fat or oil composition, it is possible to add optionally milk products such as water-soluble proteins and milk proteins such as cheese, fermented milk, coloring matter, flavoring agents, sweetening agents, saccharides, salt, fruit juice, jam pastes for emulsion stabilization and perfumes to the intermediate water phase W and the outermost oil phase $O_2$.

In order to further improve the stability of the $O_1/W$ emulsion, it is possible to add also an emulsifier such as a sucrose higher fatty acid ester esterified with a lower fatty acid ester, a sucrose higher fatty acid ester not esterified with a lower fatty acid, a glycerol higher fatty acid monoester, a propylene glycol higher fatty acid monoester, a sorbintan higher fatty acid partial ester or a polyoxyethylene sorbitan higher fatty acid partial ester to $O_1$. These emulsifiers and stabilizers may also be added to W or $O_2$.

The weight proportions of the innermost oil phase $O_1$, the intermediate water phase W and the outermost oil phase $O_2$ in the $O_1/W/O_2$ doubly emulsified fat or oil composition of this invention are desirably in a range of 0.1 to 40% by weight of $O_1$, 5 to 70% by weight of W and 20 to 80% by weight of $O_2$.

The $O_1/W/O_2$ doubly emulsified fat or oil composition of this invention is one markedly improved in stability, meltability in the mouth and shape retention when compared with a conventional $O_1/W/O_2$ doubly emulsified fat or oil composition or a conventional O/W emulsified fat or oil composition and can be extensively used for cream, spread and cream for confectionery and baking.

The $O_1/W/O_2$ doubly emulsified fat or oil composition of this invention is characterized by containing a diglyceride, so that it exhibits a marked effect of enhancing the emulsion stability of the inner phase $O_1/W$ and extremely improving both of the meltability in the mouth and shape retention, which have been contradictory hereinbefore. Further, the performance of the above composition is particularly remarkably improved when a phospholipid mixture is used as an emulsifying agent.

This invention will now be described in more detail with reference to Examples and Comparative Examples, though this invention is not limited to them. In all of the Examples and Comparative Examples, percentages and parts are by weight.

Preparation of diglyceride diglyceride (1):

75 parts by weight of rape oil (iodine value of 118) was mixed with 25 parts by weight of glycerol, and 0.1 part by weight of calcium hydroxide was added thereto to conduct glycerolysis according to a conventional method. The reaction mixture was subjected to thin-film molecular distillation to remove monoglyceride fully. The distillation bottom was purified to give 40 parts by weight of diglyceride (1). This diglyceride (1) comprised 19.4% of triglyceride, 79.6% of diglyceride and 1.0% of triglyceride and had an open-tube melting point of 10.2° C.

diglyceride (2):

The same procedure as that of the above was followed by using corn oil (iodine value of 125) to give diglyceride (2). This diglyceride (2) comprised 17.8% of triglyceride, 81.6% of diglyceride and 0.6% of monoglyceride and had an open-tube melting point of 8.6° C.

Preparation of phospholipid mixture

Soybean lecithin was treated with phospholipase D to reduce the content of phosphatidylcholine and phosphatidylethanolamine, while increasing the content of nitrogen atom-free phospholipids such as phosphatidylinositol and phosphatidic acid (and its calcium salt). Thus phospholipid mixtures (1) and (2) were obtained. The chemical compositions of these mixtures are given in Table 1.

For comparison, the chemical composition of soybean lecithin (phospholipid mixture (3)) is also given in Table 1.

TABLE 1

| Chemical Composition of Phospholipid Mixture | | | |
|---|---|---|---|
| | Phospholipid mixture | | |
| Sample No. | (1) | (2) | (3) |
| Acetone insolubles[1] (%) | 96.8 | 96.2 | 95.9 |
| PC content[2] (%) | 0.1 | 0.1 | 29.3 |
| PE content[3] (%) | 10.5 | 0.3 | 21.1 |
| PI content[4] (%) | 23.1 | 11.2 | 15.8 |
| PA content[5] (%) | 31.0 | 56.2 | 11.8 | notes
[1] Acetone insolubles: lecithins described in Japanese Standard of Food Additives.
[2] PC content: phosphatidylcholine content (% by weight) of the acetone insolubles, determined by TLC according to the Standard Analytical Method for Fats and Oils (2.2.8.4a.86 Phosphorus composition of phospholipid) (edited by the Japan Oil Chemists' Society)
[3] PE content: phosphatidylethanolamine content (% by weight) of the acetone insolubles, determined by TLC in the same manner as that of the note 2)
[4] PI content; phosphatidylinositol content (% by weight) of the acetone insolubles, determined by TLC in the same manner as that of the note 2).
[5] PA content: content of phosphatidic acid (and its calcium salt) in the acetone insolubles (% by weight), determined by TLC in the same manner as that of the note 2).

Preparation of $O_1/W/O_2$ emulsified composition

The innermost oil phase $O_1$ at 60° C. and the water phase at 60° C. were mixed together according to the formulation given in Table 2, and the resulting mixture was fed to a homogenizer to give an $O_1/W$ emulsion. This $O_1/W$ emulsion was added to the outermost oil phase $O_2$ heated at 60° C. The obtained mixture was agitated, rapidly cooled and kneaded to give an $O_1/W/O_2$ emulsified composition.

TABLE 2

| Formulation | Components (kg) | Ex. No. | | | | | Comp. Ex. No. | | |
|---|---|---|---|---|---|---|---|---|---|
| | | 1 | 2 | 3 | 4 | 5 | 1 | 2 | 3 |
| Innermost oil phase ($O_1$) | milk fat | 194 | 194 | | 194 | 194 | 194 | 194 | |
| | rape oil | | | | | | | | 194 |
| | diglyceride (2) | | | 194 | | | | | |
| | sucrose higher fatty acid ester | 3 | 3 | 3 | 3 | 3 | 3 | 3 | 3 |
| | sorbitan higher fatty acid ester | 2 | 2 | 2 | 2 | 2 | 2 | 2 | 2 |
| | soybean lecithin | 1 | 1 | 1 | | 1 | 1 | 1 | 1 |
| | phospholipid mixture (1) | | | | 1 | | | | |
| Water phase | water | 177 | 177 | 177 | 177 | 177 | 177 | 177 | 177 |

TABLE 2-continued

| Formulation | Components (kg) | Ex. No. 1 | 2 | 3 | 4 | 5 | Comp. Ex. No. 1 | 2 | 3 |
| --- | --- | --- | --- | --- | --- | --- | --- | --- | --- |
| (W) | sodium casein | 2 | 2 | 2 | 2 | 2 | 2 | 2 | 2 |
| | sucrose higher fatty acid ester | 6 | 6 | 6 | 6 | 6 | 6 | 6 | 6 |
| | common salt | 15 | 15 | 15 | 15 | 15 | 15 | 15 | 15 |
| Outermost oil phase ($O_2$) | hardened fish oil (m.p. 32° C.) | 274 | 274 | 434 | 274 | 274 | 354 | 394 | 434 |
| | palm oil | 80 | 80 | 80 | 80 | 80 | 80 | 80 | 80 |
| | soybean oil | 80 | 80 | 80 | 80 | 80 | 80 | 80 | 80 |
| | rape oil | | | | | | 80 | | |
| | diglyceride (1) | 160 | | | 160 | 160 | | 40 | |
| | diglyceride (2) | | 160 | | | | | | |
| | higher fatty acid monoglyceride | 5 | 5 | 5 | 5 | 5 | 5 | 5 | 5 |
| | soybean lecithin | 1 | 1 | 1 | | | 1 | 1 | 1 |
| | phospholipid mixture (1) | | | | 2 | | | | |
| | phospholipid mixture (2) | | | | | 2 | | | |
| | β-carotene | 5 | −5 | 5 | 5 | 5 | 5 | 5 | 5 |
| | butter flavor | 0.1 | 0.1 | 0.1 | 0.1 | 0.1 | 0.1 | 0.1 | 0.1 |

The $O_1/W/O_2$ emulsified compositions obtained in Examples 1 to 5 and Comparative Examples 1 to 3 were evaluated for emulsion stability, shape retention as butter cream and meltability in the mouth. The results are given in Table 3.

① emulsion stability

The emulsified composition was stored at 20° C. and changes in the states of the surface and inside with the lapse of time were evaluated with the naked eye, while the stability of the O/W emulsion was evaluated microscopically.

② shape retention

Artificial flowers were made of a butter cream whose specific volume was adjusted to 2.0 cc/g to evaluate the extent of deformation of the flowers at various temperatures with the naked eye.

evaluation criteria

− − did not deform at all
− the tips of the petals partially deformed
± the tips of the petals rounded
+ the whole deformed
+ + deformed to lose the shape of the flower ③ meltability in the mouth Five-point evaluation was made by each of 20 panellists to evaluate the meltability in terms of the total point.

TABLE 3

| | Evaluation Results of Butter Cream | | | | |
| --- | --- | --- | --- | --- | --- |
| | Emulsion stability | Shape retention at | | | Meltability in the mouth |
| | | 20° C. | 25° C. | 30° C. | |
| Example 1 | good | − − | − − | − | 92 |
| Example 2 | good | − − | − − | − | 93 |
| Example 3 | good | − − | − − | − | 92 |
| Example 4 | very good | − − | − − | − | 95 |
| Example 5 | very good | − − | − − | − − | 96 |
| Comp. Ex. 1 | slightly bad | ± | + | + + | 44 |
| Comp. Ex. 2 | slightly bad | ± | + | + | 56 |
| Comp. Ex. 3 | bad | ± | + | + + | 36 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil-in-water-in-oil doubly emulsified fat or oil composition comprising 10 to 100% by weight, based on the total fat or oil content, of a diglyceride having an open-tube melting point of below 20° C. in at least one of the innermost oil phase and the outermost oil phase.

2. An oil-in-water-in-oil doubly emulsified fat or oil composition as set forth in claim 1, wherein said diglyceride is one in which the proportion of unsaturated fatty acid residues having a chain length of 16 to 22 carbon atoms is at least 70% by weight based on the total fatty acid residues.

3. An oil-in-water-in-oil doubly emulsified fat or oil composition as set forth in claim 1, wherein said composition contains an emulsifying agent which comprises a phospholipid mixture, having a ratio of the amount of nitrogen atom-free phospholipids to that of nitrogen-containing phospholipids of at least 1.0 by weight, and is contained in at least one of the innermost oil phase and the outermost oil phase in an amount of 0.01 to 10% by weight.

4. An oil-in-water-in-oil doubly emulsified fat or oil composition as set forth in claim 1, which further comprises 0.01 to 10 percent by weight of a phospholipid mixture in at least one of the innermost and the outermost oil phases.

5. An oil-in-water-in-oil doubly emulsified fat or oil composition as set forth in claim 1, which further comprises 0.01 to 10 percent by weight of lecithin in at least one of the innermost and the outermost oil phases.

6. An oil-in-water-in-oil doubly emulsified fat or oil composition as set forth in claim 1, which further comprises 0.01 to 10 percent by weight of a phospholipid mixture in at least one of the innermost and the outermost oil phases, the phospholipid mixture comprising a phospholipid having no nitrogen and another having nitrogen at a weight ratio of 1.0 or larger.

* * * * *